United States Patent [19]

Hirano et al.

[11] Patent Number: 4,568,238

[45] Date of Patent: Feb. 4, 1986

[54] HORIZONTAL MULTI-LINK TYPE ROBOT

[75] Inventors: Yoshihiro Hirano; Hitoshi Kanaiwa; Osamu Toyama, all of Kariya, Japan

[73] Assignee: Toyoda Koki Kabushiki Kaisha, Kariya, Japan

[21] Appl. No.: 540,620

[22] Filed: Oct. 11, 1983

[30] Foreign Application Priority Data

Oct. 12, 1982 [JP] Japan ................. 57-178647

[51] Int. Cl.[4] ............................ B66C 23/00
[52] U.S. Cl. ................. 414/744 R; 901/14; 901/23; 901/48
[58] Field of Search .......... 414/744 R, 744 A, 744 B, 414/744 C, 735; 901/14, 18, 21, 23, 24, 26, 48

[56] References Cited

U.S. PATENT DOCUMENTS 4,392,776 7/1983 Shum ..................... 414/744 R
4,431,366 2/1984 Inaba et al. .................. 414/735

FOREIGN PATENT DOCUMENTS 0069483 1/1983 European Pat. Off. .......... 901/14 X
0000560 1/1978 Japan ..................... 901/14 X
55-112789 8/1980 Japan .

OTHER PUBLICATIONS

Japanese Monthly Journal "Kikai Setsukei" vol. 26, No. 12, (Oct. 1982), pp. 112-113, particularly photo 1 of p. 112.

Primary Examiner—Joseph E. Valenza
Assistant Examiner—Donald W. Underwood
Attorney, Agent, or Firm—Oblon, Fisher, Spivak, McClelland & Maier

[57] ABSTRACT

A horizontal multi-link type robot has servomotors for rotating first and second arms, respectively. These servomotors are mounted to a first arm support shaft so as to be symmetrical with respect to this shaft. The first arm is mounted to the first arm support shaft so as to be rotatable in a horizontal plane. The second arm is mounted to a second arm support shaft, which extends parallel to the first arm support shaft and is rotatably held to the first arm. A tool holding shaft extends parallel to the second arm support shaft and is rotatably held to the second arm.

3 Claims, 4 Drawing Figures

HORIZONTAL MULTI-LINK TYPE ROBOT

BACKGROUND OF THE INVENTION

1. Field of the Invention

The present invention relates to a horizontal multi-link type robot in which a plurality of arms are connected together and to a support shaft capable of moving up and down such that the arms can revolve around vertical lines.

2. Discussion of the Background

In a conventional horizontal multi-link type robot where arms rotate about vertical lines, a first arm which is rotatable about a vertical line is mounted to the upper end of a translation portion which moves up and down relative to the base. A second arm is mounted rotatable about an axis parallel to the vertical line about which the first arm rotates.

Generally, in horizontal multi-link type robots of this kind, the servomotor for rotating the second arm has been mounted so as to protrude from an upper portion of the first arm in coaxial relation to the axis about which the first arm rotates, while the servomotor for rotating the first arm has been mounted to an upper portion of the outer surface of the translation portion on the opposite side to the second arm. Accordingly, the robot of this construction requires a large space for installation.

In an attempt to solve the aforementioned problem, the servomotor for rotating the second arm has been mounted to a lower position on the first arm, and the second arm has been mounted rotatable about the shaft to which the first arm is held. In this construction, however, the first and second arms and the servomotor for the second arm are all held to the shaft on the side of the second arm, and therefore the moment about the shaft to which the first arm is held is greatly imbalanced. The result is that a greater load is imposed on the servomotor for the first arm. Further, since the servomotor for the first arm is mounted to an upper position on the outer surface of the translation portion on the opposite side from the second arm, it is technically impossible to mount the servomotor for the first arm to a lower position on the first arm and on the opposite side of the first arm support shaft from the second arm.

SUMMARY OF THE INVENTION

Accordingly, it is the main object of the present invention to provide a horizontal multi-link type robot which is free from the foregoing difficulties with the conventional robots.

It is a more specific object of the invention to provide a horizontal multi-link type robot which has two such servomotors for respectively rotating first and second arms that are disposed at lower positions in the first arm and on opposite sides of the shaft to which the motors are held, whereby the robot can be made compact. Further, the moment about the shaft to which the first and second arms are held can be reduced, and the load imposed on the servomotor for the first arm can be decreased.

Other objects and features of the present invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENT

Figure 1:
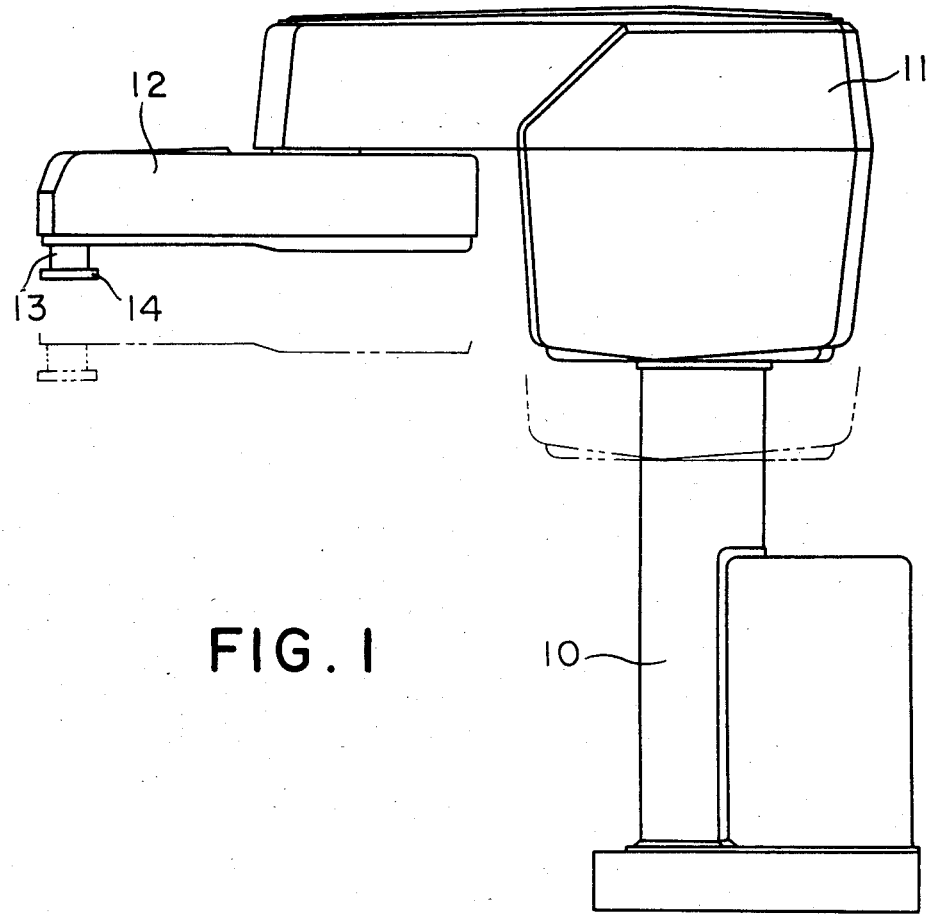
FIG. 1 is a schematic side elevation of a horizontal multi-link type robot according to the present invention.

Referring first to FIG. 1, the entire construction of a horizontal multi-link type robot embodying the concept of the present invention is shown. The robot has a base 10 in which a first arm support shaft (described later) is held movable up and down. A first arm 11 is mounted to the upper end of this shaft so as to be rotatable about a vertical line. A second arm 12 is held to the front end of the first arm 11 such that it can rotate about an axis parallel to the axis about which the first arm 11 rotates. A tool holding shaft 13 is mounted to the front end of the second arm 12 so as to be rotatable about an axis parallel to the axis about which the second arm 12 rotates. The lower end of the tool holding shaft 13 is provided with jaws 14, to which various tools can be installed according to the operation to be effected. The components of the robot are hereinafter described in detail.

Figure 2:
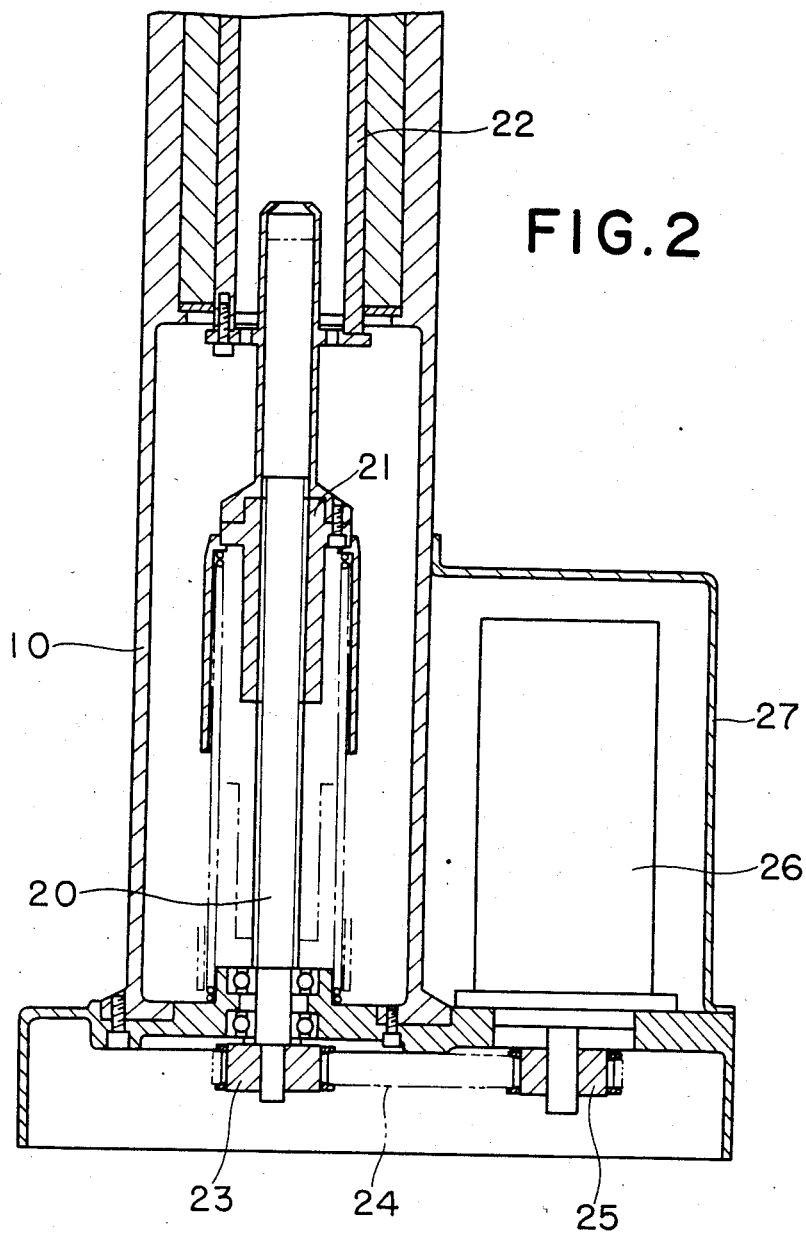
FIG. 2 is a cross-sectional view of the mechanism for moving up and down the first arm of the robot shown in FIG. 1.

Referring next to FIG. 2, a threaded rod 20, onto which a nut 21 is fitted, is held within the base 10 at a lower position such that the rod can rotate about a vertical axis. A hollow, first arm support shaft 22 is held vertically slidable along the axis of the rod 20 at a higher position within the base 10. However, rotation of the shaft 22 is not allowed. The aforementioned nut 21 is firmly fixed to the lower end of the shaft 22. A toothed belt pulley 23 is installed to the lower end of the threaded rod 20, and a timing belt 24 is trained around the pulley 23 and another toothed belt pulley 25, which is installed to the lower end of a servomotor 26 secured to the base 10 at a lower position. Rotation of the servomotor 26 is transmitted to the threaded rod 20 via the belt pulley 25, the timing belt 24, and the belt pulley 23, and the rod 20 vertically moves the first arm support shaft 22 via the nut 21 screwed to the rod 20. A cover 27 is installed to the base 10 so as to cover the servomotor 26.

Figure 3:
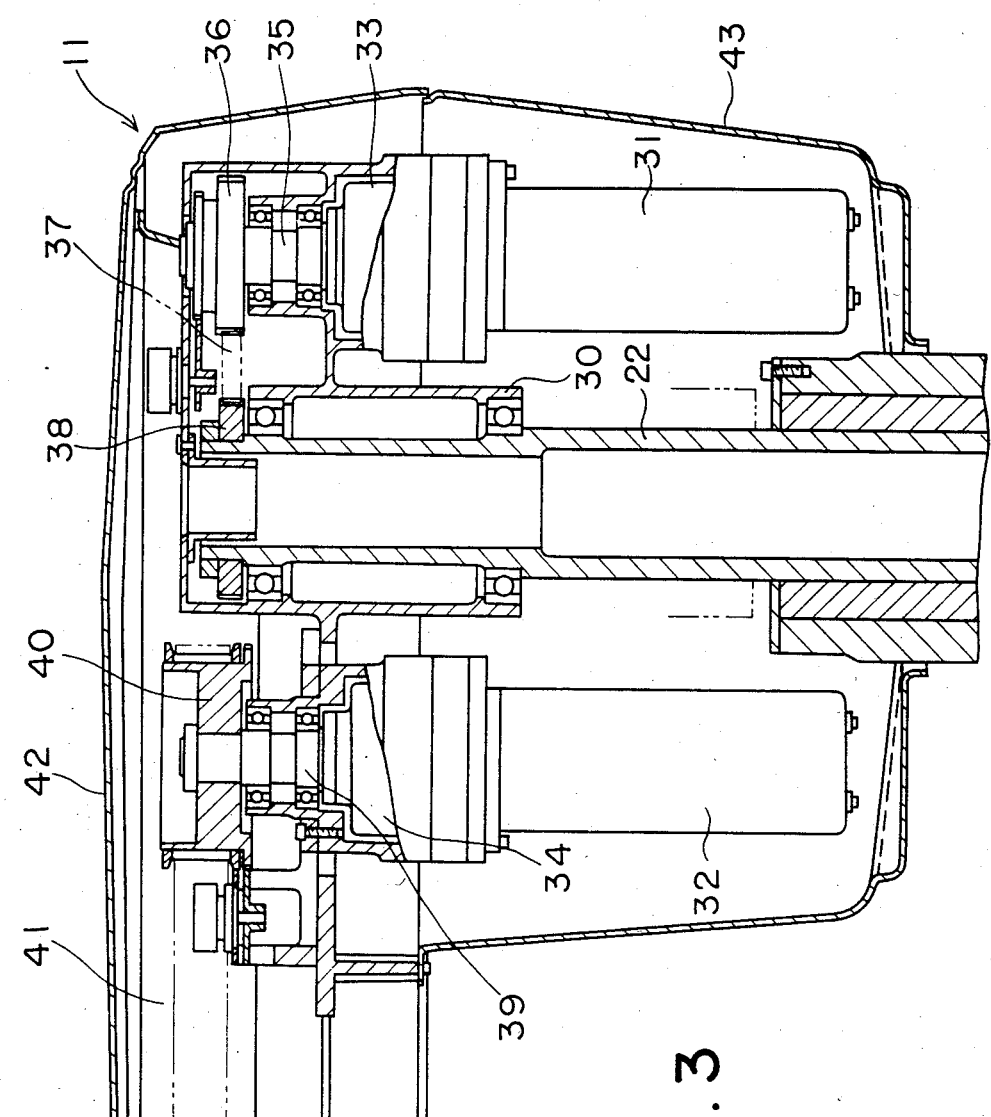
FIG. 3 is a cross-sectional view of the mechanisms for rotating the first and second arms, respectively, of the robot shown in FIG. 1.
Figure 4:
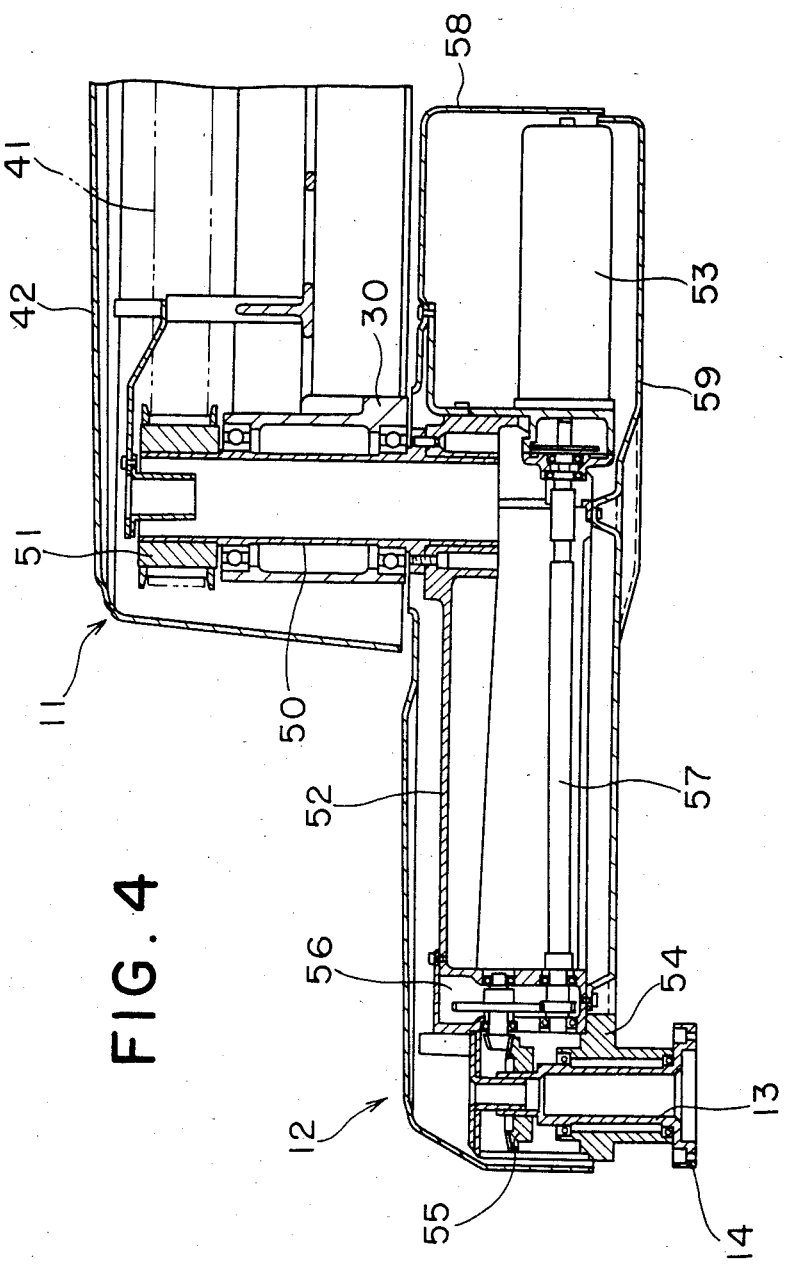
FIG. 4 is a cross-sectional view of the mechanism for rotating the tool holding shaft shown in FIG. 1.

Referring now to FIGS. 3 and 4, the body of a first arm 30 is held to the first arm support shaft 22, which is movable up and down. The body of the first arm 30 is rotatable in a horizontal plane. Mounted to the underside of the body 30 are two harmonic drives 33 and 34 (hereinafter referred to as reduction mechanisms) to which servomotors 31 and 32 are connected, respectively. The reduction mechanisms 33 and 34 are disposed in parallel to the body of the first arm 30 and at positions which are substantially symmetrical with respect to the first arm support shaft 22. A first driving shaft 35 is connected to the reduction mechanism 33 and is rotatably held to the body of the first arm 30 above the mechanism 33. A driving gear 36 is mounted to the upper end of the first driving shaft 35, and an intermediate gear 37 which is rotatably held to the body of the first arm 30 meshes with the driving gear 36. The intermediate gear 37 also meshes with a toothed wheel 38 which is securely fixed to the upper end of the first arm support shaft 22. Rotation of the servomotor 31 is transmitted to the driving gear 36 via the reduction mechanism 33 and the first driving shaft 35. As the toothed wheel 38 is made stationary, the intermediate gear 37 is rotated around the wheel 38. Therefore, the body of the first arm 30 rotatably supporting the intermediate gear 37 is rotated around the first arm support shaft 22. A second driving shaft 39 is connected to the reduction mechanism 34 and is rotatably held to the body of the first arm 30 above the mechanism 34. A toothed belt pulley 40 is installed to the upper end of the second driving shaft 39, and a timing belt 41 is trained around the pulley 40.

Referring specifically to FIG. 4, a second arm support 50 is held to the body of the first arm 30 so as to be rotatable about an axis parallel to the second driving shaft 39. The shaft 50 is disposed along the line passing through the second driving shaft 39 and the first driving shaft 35 and is located on the side of the second shaft 39. A toothed belt pulley 51 is mounted to the upper end of the support shaft 50 and trained around the above-described timing belt 41. Firmly secured to the lower end of the shaft 50 is the body of a second arm 52, to which a servomotor 53 is mounted in perpendicular relation to the shaft 50. Rotation of the servomotor 32 is transmitted to the toothed belt pulley 40 via the reduction mechanism 34 and the second driving shaft 39. The pulley 40, in turn, rotates the shaft 50 via the belt 41 and the pulley 51. Then, the rotation of the shaft 50 turns the body of the second arm 52, which is fixed to the shaft 50, around the shaft 50. A supporting body 54 is firmly secured to the front end of the body of the second arm 52 which is located on the opposite side of the body 52 from the servomotor 53. The aforementioned tool holding shaft 13 is held to the supporting body 54 so as to be rotatable about an axis parallel to the second arm support shaft 50. A bevel gear 55 is mounted to the upper end of the tool holding shaft 13 and is connected to the servomotor 53 via a reduction mechanism 56 and a transmission shaft 57, so that rotation of the servomotor 53 is transmitted to the bevel gear 55. The reduction mechanism 56 is rotatably held to the body of the second arm 52. An upper cover 42 which covers from the first driving shaft 35 to the second arm support shaft 50 is mounted above the body of the first arm 30. A lower cover 43 spreads over the servomotors 31 and 32 and is mounted to the body of the first arm 30 at the position where it is joined to the upper cover 42. The lower cover 43 is provided with an opening to allow the base 10 to be inserted in the cover. A second upper cover 58 provides cover from the servomotor 53 to the tool holding shaft 13 and is mounted above the body of the second arm 52. The cover 58 is provided with an opening to allow the second arm support shaft 50 to be inserted in the cover 58. A second lower cover 59 covers from the lower end of the upper cover 58 to the lower end of the servomotor 53 and from the servomotor 53 to the vicinity of the supporting body 54 and is mounted to the body of the second arm 52 at the position where the lower cover is coupled to the upper cover 58.

In the operation of the structure described above, rotation of the servomotor 26 moves up and down the first arm support shaft 22 relative to the base 10. Rotation of the servomotor 31 turns the first arm 11 around the first arm support shaft 22. Rotary motion of the servomotor 32 is transmitted to the second arm 12 via the toothed belt pulley 40, timing belt 41, and toothed belt pulley 51. Therefore, the second arm 12 secured to the front end of the first arm 11 is rotated around the second arm support shaft 50. As the servomotor 53 mounted in the second arm 12 is rotated, the tool holding shaft 13 mounted to the front end of the second arm 12 is rotated around a vertical axis.

As hereinbefore described, the novel structure is so constructed that the servomotors for rotating the first and second arms, respectively, are disposed at lower positions in the first arm and juxtaposed on opposite sides of the first arm support shaft. Consequently, the robot can be made compact. Further, the moment about the first arm support shaft can be reduced, and the load imposed on the servomotor for rotating the first arm can be decreased.

Obviously many modifications and variations of the present invention are possible in the light of the above teachings. It is therefore to be understood that within the scope of the appended claims the invention may be practiced otherwise than as specifically described.

What is claimed is:

1. A horizontal multi-link type robot comprising:
   a base,
   a first arm support shaft held on the base so as to be movable up and down,
   a first driving mechanism for moving up and down the first arm support shaft,
   a first arm mounted on the first arm support shaft so as to be rotatable in a horizontal plane,
   a second driving mechanism for rotating the first arm,
   a rotatable second arm support shaft held on the first arm in parallel relation to the first arm support shaft,
   a second arm mounted on the second arm support shaft,
   a third driving mechanism for rotating the second arm,
   a rotatable tool holding shaft held on one end of the second arm in parallel relation to the second arm support shaft, and
   a fourth driving mechanism for rotating the tool holding shaft,
   wherein the second and third driving mechanisms include servomotors for driving the first and second arms, respectively, the servomotors being mounted on the first arm in such a manner that they are disposed on a straight line passing through both the first arm support shaft and the second arm support shaft and at opposite sides of the first arm support shaft, and
   wherein said servomotors for driving the first and second arms depend from the underside of the first arm in parallel relation to the first arm support shaft.

2. A horizontal multi-link type robot as set forth in claim 1, wherein said second driving mechanism includes a stationary gear firmly secured to the first arm support shaft, a driving gear secured to the output shaft of the servomotor for driving the first arm, and an intermediate gear rotatably held on the first arm and mating with both the stationary gear and the driving gear.

3. A horizontal multi-link type robot as set forth in Claim 1, wherein said fourth driving mechanism includes a tool holding shaft driving servomotor extending horizontally and firmly secured to the other end of the second arm so as to be diametrically opposite to the tool holding shaft with respect to the second arm support shaft, a rod rotatably held on the second arm and extending from said one end to said other end of the second arm for transmitting rotation of the tool holding shaft driving servomotor, and a bevel gear mechanism for transmitting rotation of the rod to the tool holding shaft.

* * * * *